(12) United States Patent
Bannai

(10) Patent No.: US 12,451,548 B2
(45) Date of Patent: Oct. 21, 2025

(54) BATTERY PACK AND ELECTRIC VEHICLE

(71) Applicant: MURATA MANUFACTURING CO., LTD., Kyoto (JP)

(72) Inventor: Yoshiyuki Bannai, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 507 days.

(21) Appl. No.: 17/957,087

(22) Filed: Sep. 30, 2022

(65) Prior Publication Data

US 2023/0029767 A1  Feb. 2, 2023

Related U.S. Application Data

(63) Continuation of application No. PCT/JP2021/012818, filed on Mar. 26, 2021.

(30) Foreign Application Priority Data

Mar. 30, 2020  (JP) ................ 2020-060780

(51) Int. Cl.
*H01M 50/213*  (2021.01)
*H01M 50/262*  (2021.01)
(Continued)

(52) U.S. Cl.
CPC ....... *H01M 50/213* (2021.01); *H01M 50/262* (2021.01); *H01M 50/271* (2021.01); *H01M 50/317* (2021.01); *H01M 50/333* (2021.01); *H01M 2200/20* (2013.01); *H01M 2220/20* (2013.01)

(58) Field of Classification Search
None
See application file for complete search history.

(56) References Cited

U.S. PATENT DOCUMENTS

2008/0220321 A1  9/2008  Yonemochi et al.
2012/0183824 A1  7/2012  Cho et al.
(Continued)

FOREIGN PATENT DOCUMENTS

| JP | S4614421 Y1 | 5/1971 |
| JP | 2008226518 A | 9/2008 |

(Continued)

OTHER PUBLICATIONS

Machine Translation of JP-2015106531-A (Year: 2015).*
(Continued)

*Primary Examiner* — Gregg Cantelmo
(74) *Attorney, Agent, or Firm* — K&L Gates LLP

(57) ABSTRACT

A battery pack includes: a battery cell; one or more shoulder screws having a head portion, a screw portion, and an intermediate portion between the head portion and the screw portion, the intermediate portion being larger than an outer diameter of the screw portion and smaller than an outer diameter of the head portion; and an exterior case including an upper case and a lower case fastened to each other with the one or the plurality of shoulder screws. A first elastic member is disposed in a compressed state at a contact portion between the upper case and the lower case, and a second elastic member is disposed in a compressed state between the head portion and the upper case.

15 Claims, 10 Drawing Sheets

(51) Int. Cl.
*H01M 50/271* (2021.01)
*H01M 50/317* (2021.01)
*H01M 50/333* (2021.01)

(56) References Cited

U.S. PATENT DOCUMENTS

| | | | |
|---|---|---|---|
| 2015/0207119 A1* | 7/2015 | Onodera | H01M 50/3425 |
| | | | 429/89 |
| 2017/0018747 A1* | 1/2017 | Yamada | H01M 10/625 |
| 2018/0097214 A1 | 4/2018 | Ogawa et al. | |
| 2020/0203688 A1 | 6/2020 | Kinoshita et al. | |

FOREIGN PATENT DOCUMENTS

| | | | |
|---|---|---|---|
| JP | 2012151449 A | | 8/2012 |
| JP | 2014228098 | | 12/2014 |
| JP | 2015106531 A | * | 6/2015 |
| JP | 2018060880 A | | 4/2018 |
| WO | 2016017687 A1 | | 2/2016 |
| WO | 2016076427 A1 | | 5/2016 |
| WO | 2016119155 A | | 6/2016 |
| WO | 2019146239 A1 | | 8/2019 |

OTHER PUBLICATIONS

Machine Translation of WO 2016076427A (Year: 2016).*
Chinese Office Action issued Jun. 20, 2024 in corresponding Chinese Application No. 202180026237.5.
Japanese Office Action issued Dec. 24, 2024 in corresponding Japanese Application No. 2023-205785.
Chinese Office Action issued Mar. 8, 2024 in corresponding Chinese Application No. 202180026237.5.
Chinese Office Action issued Sep. 11, 2023 in corresponding Chinese Application No. 202180026237.5.
International Search Report of corresponding PCT application PCT/JP2021/012818, dated Jun. 15, 2021.
Chinese Office Action issued Oct. 24, 2024 in corresponding Chinese Application No. 202180026237.5.
Japanese Office Action for corresponding JP Application No. 2023-205785, dated Mar. 26, 2025. (2 pages).
Japanese Office Action issued Jul. 4, 2023 in corresponding Japanese Application No. 2022-512111.
Office Action issued for corresponding Japanese Patent Application No. 2023-205785, dated Aug. 12, 2025. (2 pages.).
Office Action issued for corresponding Japanese Patent Application No. 2023-205785, dated Aug. 12, 2025. (4 pages.).

* cited by examiner

A

B

BATTERY PACK AND ELECTRIC VEHICLE

CROSS REFERENCE TO RELATED APPLICATIONS

The present application is a continuation of PCT patent application no. PCT/JP2021/012818, filed on Mar. 26, 2021, which claims priority to Japanese patent application no. JP2020-060780, filed on Mar. 30, 2020, the entire contents of which are herein incorporated by reference.

BACKGROUND

The present application relates to a battery pack and an electric vehicle.

A battery pack in which a battery cell group in which a plurality of battery cells such as lithium ion secondary batteries are connected is housed in an exterior case is widely used for electric vehicles, power tools, and the like. When moisture enters the inside of the battery pack, the moisture causes to damage an electrode terminal portion of the battery cell; therefore, the battery pack is provided with a technique for enhancing waterproofness.

A technique is proposed of using a shoulder screw for fastening a case and a lid to suppress looseness of fastening between the case and the lid due to fatigue of a sealing material in a battery pack hermetically sealed with the sealing material disposed between the case and the lid. This technique has room for improvement in preventing explosion of the battery pack by releasing gas from the battery pack to the outside when the gas is jetted from the battery cell due to abnormality of the battery cell.

A second technique is proposed of blocking a slit opening previously formed in a battery pack case with a blocking member that melts at a temperature in the battery pack raised by a combustible gas released from the battery.

SUMMARY

The present application relates to a battery pack and an electric vehicle.

The second technique proposed and referenced above has room for improvement in preventing explosion of the battery pack by releasing the gas from the battery pack to the outside when a gas jet speed from the battery cell is high, and in preventing burning due to inflow of outside air into the battery pack when the gas is released.

The present relates to providing a battery pack capable of preventing explosion of the battery pack when a gas jet speed from a battery cell is high, and capable of suppressing burning due to inflow of outside air into the battery pack when gas is released according to an embodiment.

The present technology, in an embodiment, is a battery pack including: a circuit board; a battery cell; one or a plurality of shoulder screws having a head portion, a screw portion, and an intermediate portion between the head portion and the screw portion, the intermediate portion being larger than an outer diameter of the screw portion and smaller than an outer diameter of the head portion; and an exterior case including an upper case and a lower case fastened to each other with the one or the plurality of shoulder screws, in which a first elastic member is disposed in a compressed state at a contact portion between the upper case and the lower case, and a second elastic member is disposed in a compressed state between the head portion and the upper case.

The battery pack of the present technology may be provided in an electric vehicle according to an embodiment.

According to an embodiment of the present application, it is possible to provide a battery pack capable of preventing explosion of the battery pack when a gas jet speed from the battery cell is high, and capable of suppressing burning due to inflow of outside air into the battery pack when gas is released.

DETAILED DESCRIPTION

The present application will be described below in further detail according to an embodiment.

The present application is not limited thereto. In the following description, directions such as front and back, left and right, and up and down are indicated in consideration of convenience of description; however, the content of the present disclosure is not limited to these directions.

Figure 1:
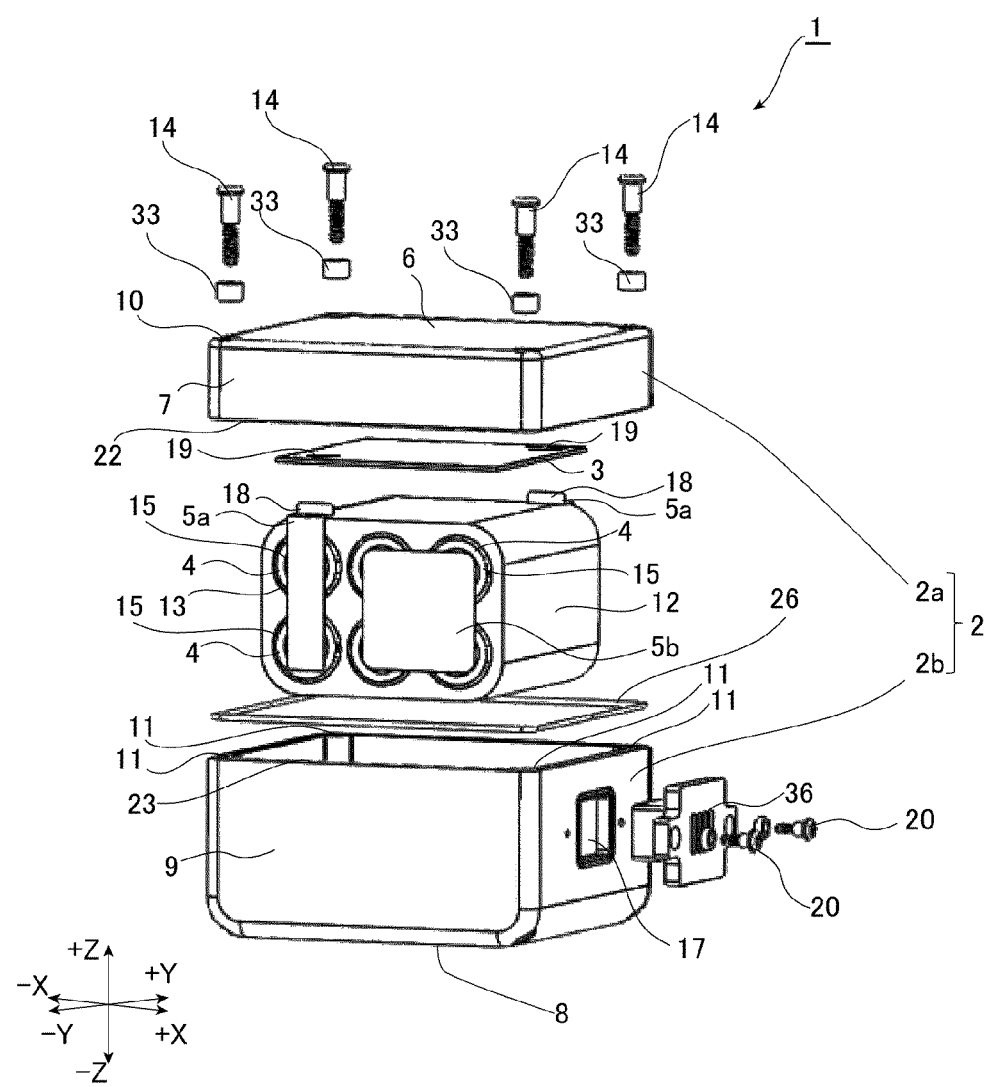
FIG. 1 is an exploded perspective view showing an example of a configuration of a battery pack according to a first embodiment.
Figure 2:
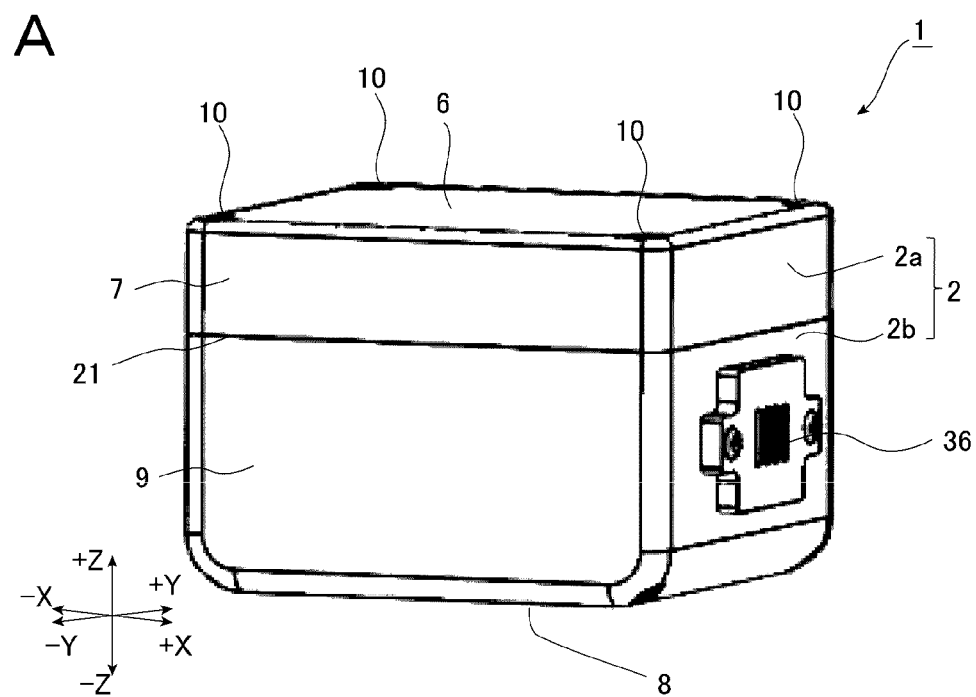
FIG. 2 includes views A and B, where view A is a perspective view showing an example of the battery pack according to the first embodiment, and view B is a plan view showing an example of the battery pack according to the first embodiment.
Figure 2:
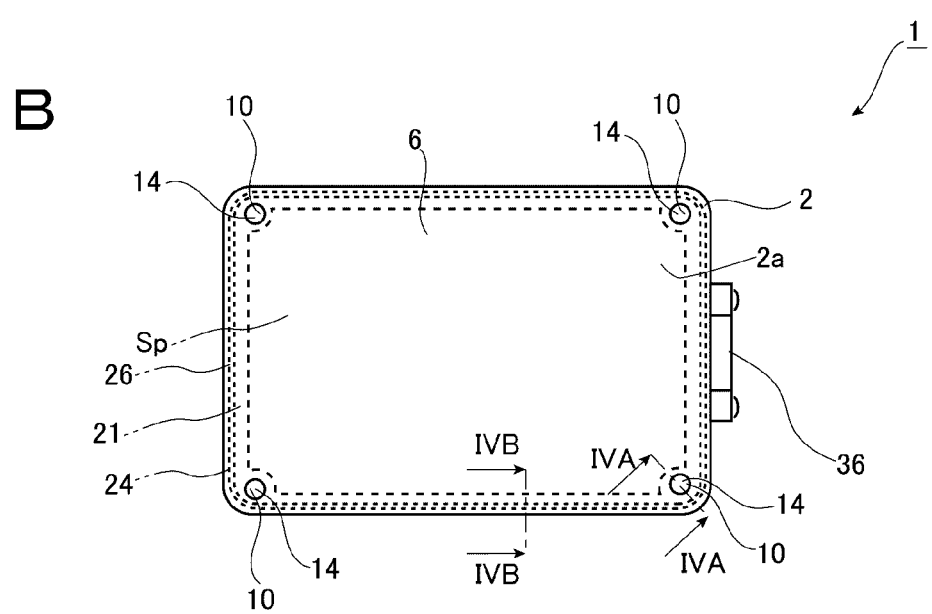
Figure 3:
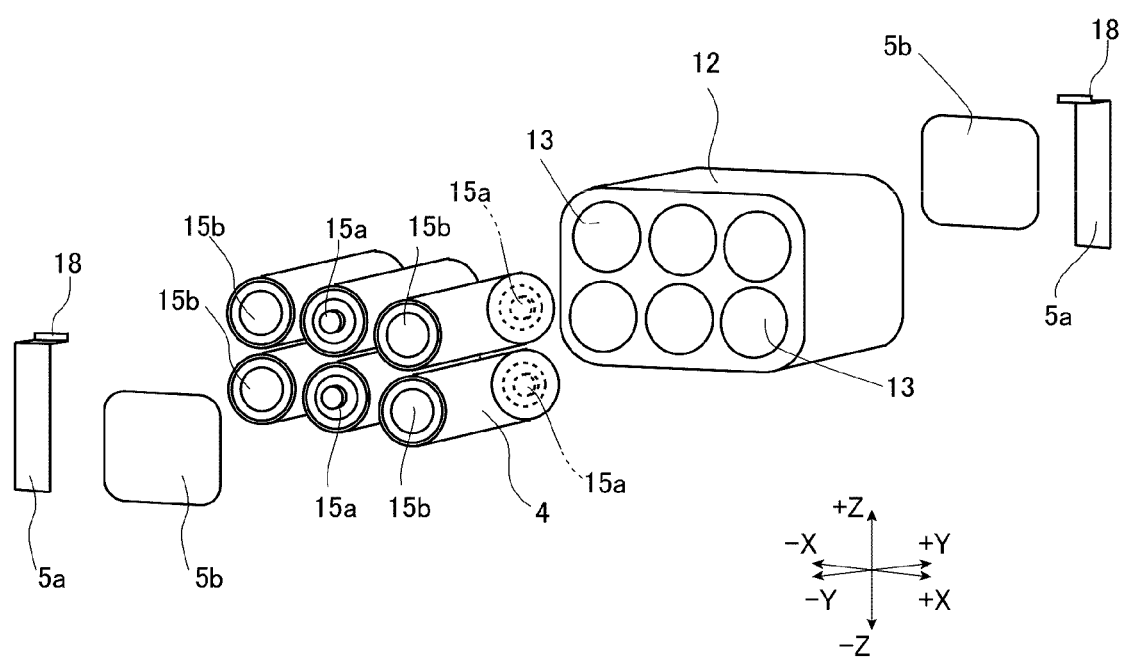
FIG. 3 is an exploded perspective view showing an example of a battery holder housed in the battery pack.

A battery pack (battery pack 1) according to a first embodiment will be described with reference to FIGS. 1 to 3 and the like. FIG. 1 is an exploded perspective view for describing a configuration example of the battery pack 1. FIG. 2A is a view for describing an appearance of the battery pack 1. FIG. 2B is a schematic plan view of the battery pack 1. FIG. 3 is an exploded perspective view of a battery holder 12 housed in an exterior case 2 of the battery pack 1 in FIG. 1. For example, as shown in FIGS. 1, 2A, and 2B and the other drawings, the battery pack 1 includes an exterior case 2 in which an upper case 2a and a lower case 2b are fastened by a shoulder screw 14. In the exterior case 2, a circuit board 3, a battery cell 4 housed in the battery holder 12, and a metal plate joined to an electrode terminal portion 15 of the battery cell 4 are housed.

The battery holder 12 is housed in an internal space Sp of the exterior case 2. As shown in FIGS. 1 and 3, and the other drawings, a plurality of battery cell housing portions 13 are formed in the battery holder 12. In the battery holder 12 in the example of FIGS. 1 and 3, the battery cell housing portion 13 is formed in a tubular shape. An axial direction of the battery cell housing portion 13 is a left-right direction (+Y direction, −Y direction) in a state where the battery holder 12 is housed in the exterior case 2. In the battery holder 12, the battery cell housing portions 13 are formed side by side in an up-down direction (+Z direction, −Z direction) and a front-rear direction (+X direction, −X direction). In the example of FIGS. 1 and 3, the battery cell housing portions 13 are arranged in three rows in the front-rear direction and in two rows in the up-down direction, and each of the battery cells 4 is housed therein. What is shown here is an example. The battery cell housing portion 13 may have a shape other than the tubular shape. The number of rows in the front-rear direction and the number of rows in the up-down direction in the battery cell housing portion 13 are not limited to the example of FIG. 1 and the like. The number of battery cells housed in one battery cell housing portion 13 is not limited to one.

Ends facing each other along the axial direction (+Y direction, −Y direction) of the battery cell housing portion 13 are opened, for example, in a substantially circular shape. The electrode terminal portion 15 (positive electrode terminal portion 15a, negative electrode terminal portion 15b) of the battery cell 4 to be described later is exposed from an opening formed at each end.

As the material of the battery holder 12, for example, a material having an insulating property is suitably used, and specifically, plastic or the like may be used.

The battery cell 4 is not particularly limited, and for example, a lithium ion secondary battery, a lithium ion polymer secondary battery, or the like can be adopted. However, this does not restrict the battery cell 4 from being the other battery.

The electrode terminal portions 15 are formed on both end surfaces of the battery cell 4. The positive electrode terminal portion 15a is formed as the electrode terminal portion 15 on one end surface of the battery cell 4, and the negative electrode terminal portion 15b is formed as the electrode terminal portion 15 on the other end surface of the battery cell 4. In FIG. 1, for convenience of explanation, reference numeral 15 is used to indicate the electrode terminal portion of the battery cell 4, and in FIG. 3, reference numerals 15a and 15b are used to indicate the positive electrode terminal portion and the negative electrode terminal portion as the battery terminal portion of the battery cell 4.

In the example of FIG. 1 and the like, the plurality of battery cells 4 are housed in the battery holder 12. Regarding the arrangement of the battery cells 4 vertically adjacent to each other, the polarities of the electrode terminal portions 15 exposed from one surface side of the battery holder 12 are aligned. For example, the battery cells 4 are arranged such that the negative electrode terminal portion 15b of the vertically adjacent battery cells 4 is exposed on one surface side of battery holder 12, and the positive electrode terminal portion 15a of the vertically adjacent battery cells 4 is exposed on the other surface side (see FIG. 3). When alignment of the electrode terminal portion 15 of the plurality of battery cells 4 housed in the battery holder 12 is viewed with a direction (Y direction) from one end surface side to the other end surface side of the battery cell 4 as a line-of-sight direction, the battery cells 4 are arranged such that the positive electrode terminal portion 15a and the negative electrode terminal portion 15b are alternately arranged in the front-rear direction. The arrangement of the battery cells 4 described here is an example, and is not limited to the illustrated arrangement.

The electrode terminal portion 15 (positive electrode terminal portion, negative electrode terminal portion) exposed from the opening of each of the battery cell housing portions 13 of the battery holder 12 is joined to a metal plate. In the battery pack 1 shown in the example of FIGS. 1 and 3, and the like, two substrate connection metal plates 5a and two bipolar connection metal plates 5b are provided as the metal plates. The substrate connection metal plate 5a is a metal plate including a terminal connected to a circuit board. The bipolar connection metal plate 5b is a metal plate that electrically connects the electrode terminal portions 15 having different polarities. The electrode terminal portion 15 of the battery cell exposed on one side surface (surface on +Y direction side) in the left-right direction of the battery holder 12 is joined to either the substrate connection metal plate 5a or the bipolar connection metal plate 5b, and the electrode terminal portion 15 of the battery cell exposed on the other side surface (surface on −Y direction side) in the left-right direction of the battery holder 12 is similarly joined to either the substrate connection metal plate 5a or the bipolar connection metal plate 5b.

With respect to one side surface (surface on +Y direction side) in the left-right direction of the battery holder 12, the substrate connection metal plate 5a is located on a front side (side in a direction approaching an external connection terminal 36 as viewed in the front-rear direction (+X direction side)) with respect to the bipolar connection metal plate 5b. On an end surface of the battery holder 12 on the +Y direction side, the substrate connection metal plate 5a is joined to the electrode terminal portion 15 (in the example of FIG. 3, two positive electrode terminal portions 15a) exposed from the opening of each of the battery cell housing portions 13 adjacent to each other in the up-down direction.

With respect to one side surface (surface on +Y direction side) in the left-right direction of the battery holder 12, the bipolar connection metal plate 5b is located on a rear side (direction side away from the external connection terminal 36 as viewed in the front-rear direction (−X direction)) of the substrate connection metal plate 5a. On the end surface of the battery holder 12 on the +Y direction side, the bipolar connection metal plate 5b is joined to the electrode terminal portion 15 (in the example of FIG. 3, two positive electrode terminal portions 15a and two negative electrode terminal portions 15b) exposed from the opening of each of the four battery cell housing portions 13 adjacent to each other in the front-rear direction and the up-down direction.

With respect to the other side surface (surface on −Y direction side) in the left-right direction of the battery holder 12, the bipolar connection metal plate 5b is located on the front side (side in the direction approaching the external connection terminal 36 as viewed in the front-rear direction (+X direction side)) with respect to the substrate connection metal plate 5a. On the end surface of the battery holder 12 on the −Y direction side, the bipolar connection metal plate 5b is joined to the electrode terminal portion 15 (in the example of FIG. 3, two positive electrode terminal portions 15a and two negative electrode terminal portions 15b)

exposed from the opening of each of the four battery cell housing portions 13 adjacent to each other in the front-rear direction and the up-down direction.

With respect to the other side surface (surface on −Y direction side) in the left-right direction of the battery holder 12, the substrate connection metal plate 5a is located on the rear side (direction side away from the external connection terminal 36 as viewed in the front-rear direction (−X direction side)) of the bipolar connection metal plate 5b. On the end surface of the battery holder 12 on the −Y direction side, the substrate connection metal plate 5a is joined to the electrode terminal portion 15 (in the example of FIG. 3, two negative electrode terminal portions 15b) exposed from the opening of each of the battery cell housing portions 13 adjacent to each other in the up-down direction.

On an upper end side of the substrate connection metal plates 5a and 5a joined to the battery cell 4 housed in the battery holder 12, a hook-shaped portion extending toward a central side of the battery holder 12 is formed on an upper surface of the battery holder 12. The hook-shaped portions form substrate connection terminals 18 and 18, respectively. Receiving terminal portions 19 and 19 for connecting the substrate connection terminals 18 and 18 are formed on the circuit board 3 described later, and the respective substrate connection terminals 18 and 18 of the substrate connection metal plates 5a and 5a are electrically connected to the circuit board 3 by being connected to the receiving terminal portions 19 and 19.

The substrate connection metal plate 5a and the bipolar connection metal plate 5b are preferably formed of a copper alloy or a material similar thereto. This makes it possible to distribute power with low resistance. The substrate connection metal plate 5a and the bipolar connection metal plate 5b are formed of, for example, nickel or a nickel alloy. As a result, weldability of the substrate connection metal plate 5a and the bipolar connection metal plate 5b with the electrode terminal portion is improved. Surfaces of the substrate connection metal plate 5a and the bipolar connection metal plate 5b may be plated with tin or nickel. As a result, it is possible to prevent the surfaces of the substrate connection metal plate 5a and the bipolar connection metal plate 5b from being oxidized and rusting.

The battery cells 4 housed in the battery holder 12 are electrically connected to each other by the substrate connection metal plate 5a and the bipolar connection metal plate 5b. In the examples of FIGS. 1 and 3, and the other drawings, combinations of the two battery cells 4 arranged vertically are connected in parallel by the substrate connection metal plate 5a and the bipolar connection metal plate 5b, and three sets of the combinations are electrically connected in series.

The above-described example of the metal plate (the substrate connection metal plate 5a and the bipolar connection metal plate 5b) joined to the electrode terminal portion 15 of the battery cell 4 is merely an example, and the number and arrangement of the metal plates, the shape and material of each metal plate, and the like can be appropriately set according to the arrangement of the electrode terminal portion 15, the battery cell 4, and the like.

The circuit board 3 is electrically connected to the external connection terminal 36 of the battery pack 1. In the example of FIG. 1, the circuit board 3 and the external connection terminal 36 are electrically connected via wiring (not shown). The circuit board 3 is electrically connected to the substrate connection terminal 18 of the substrate connection metal plate 5a, and an electric circuit is mounted on the circuit board 3. The electric circuit is formed so that electric power from the battery cell 4 can be supplied from the external connection terminal 36 to the outside.

As shown in FIGS. 1, 2A, and 2B, the exterior case 2 includes the upper case 2a and the lower case 2b, and the internal space Sp is formed in a state where the upper case 2a and the lower case 2b are combined. In the example of FIGS. 1 and 2A, the upper case 2a has a substantially rectangular upper surface portion 6. An upper peripheral wall portion 7 is erected downward (−Z direction) from the entire periphery of an outer edge of the upper surface portion 6. A depth of the upper case 2a (distance from a proximal end of the upper peripheral wall portion 7 to a distal end of the upper peripheral wall portion 7) is not particularly limited, and is shallower than a depth of the lower case 2b in the example of FIGS. 1 and 2A.

The lower case 2b has a substantially rectangular bottom surface portion 8. A lower peripheral wall portion 9 is erected upward (+Z direction) from the entire periphery of an outer edge of the bottom surface portion 8.

The materials of the upper case 2a and the lower case 2b are preferably materials having insulating properties and rigidity. Since the upper case 2a and the lower case 2b have insulating properties, a current is prevented from flowing out of the exterior case 2 from the battery cell 4. Since the upper case 2a and the lower case 2b have rigidity, the exterior case 2 has high robustness, and when the battery pack 1 is placed under a severe situation, it is easy to maintain a state in which the battery cell 4 can exhibit a function as a battery.

The external connection terminal 36 for connecting the battery cell 4 and the outside is provided at a predetermined position in the exterior case 2. As shown in the example of FIG. 1, a receiving opening 17 for attaching the external connection terminal 36 is formed on a front end side (+X direction) of the lower case 2b, and the external connection terminal 36 is fixed to the lower case 2b in a state where the external connection terminal 36 is fitted into the receiving opening 17. The fixing method is not particularly limited, and in the example of FIG. 1, a method of fastening with a fixing screw 20 at an outer peripheral edge position of the external connection terminal 36 is used.

In the exterior case 2, a contact portion 21 is formed by a portion where a distal end surface 22 of the upper peripheral wall portion 7 of the upper case 2a is in contact with a distal end surface 23 of the lower peripheral wall portion 9 of the lower case 2b. A groove portion 24 is formed at a predetermined position on the distal end surface 23 of the lower peripheral wall portion 9 of the lower case 2b. The groove portion 24 is formed in an annular shape along the distal end surface 23. In the example of FIGS. 1, 2A, and 2B, the groove portion 24 is formed in a substantially quadrangular annular shape. In the upper case 2a, a protrusion 25 is formed at a position facing the groove portion 24. The protrusion 25 is formed in an annular shape along the distal end surface 22 of the upper peripheral wall portion 7 of the upper case 2a so as to match the annular shape of the groove portion 24. From the viewpoint of bringing the exterior case 2 into a hermetically sealed state in a state where a first elastic member 26 described later is disposed in the groove portion 24, a height of the protrusion 25 is preferably smaller than the depth of the groove portion 24.

In the exterior case 2, the first elastic member 26 is disposed in a compressed state at the contact portion 21 between the upper case 2a and the lower case 2b. In the example of FIGS. 1, 2A, and 2B, the first elastic member 26 is disposed at the position of the groove portion 24 in the contact portion 21. The first elastic member 26 is not particularly limited; however, from the viewpoint of ease of installation in the groove portion 24 and the like, an annular elastic member is suitably used, and specifically, an O-ring is suitably used.

When the exterior case 2 is formed by fastening the upper case 2a and the lower case 2b, the first elastic member 26 is pressed by the protrusion 25 and the groove portion 24. Since the first elastic member 26 is fitted into the groove portion 24, the first elastic member 26 spreads into the groove portion 24 while being crushed in the groove portion 24. Then, the first elastic member 26 fills a gap between the upper case 2a and the lower case 2b at a position between the groove portion 24 and the protrusion 25 by the action of a restoring force, and a state where the internal space of the exterior case 2 is hermetically sealed is formed.

Figure 4:
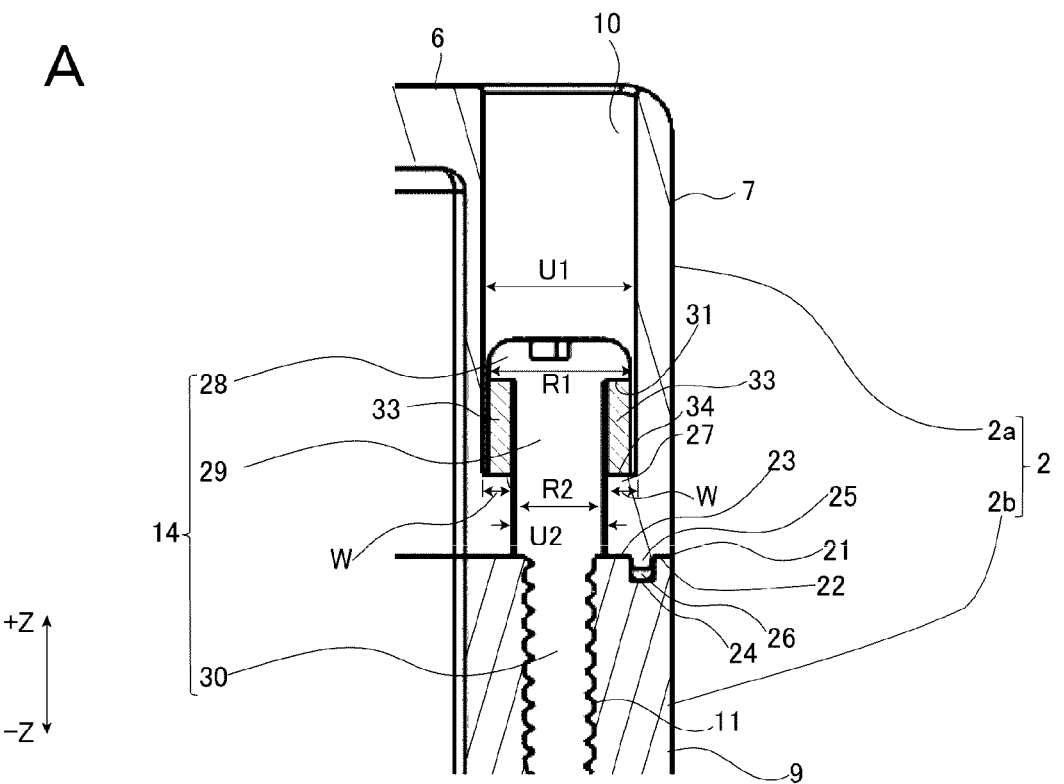
FIG. 4 includes views A and B, where view A is a sectional view for explaining an essential part in a section taken along line IVA-IVA in FIG. 2, and view B is a sectional view for explaining an essential part in a section taken along line IVB-IVB in FIG. 2.
Figure 4:
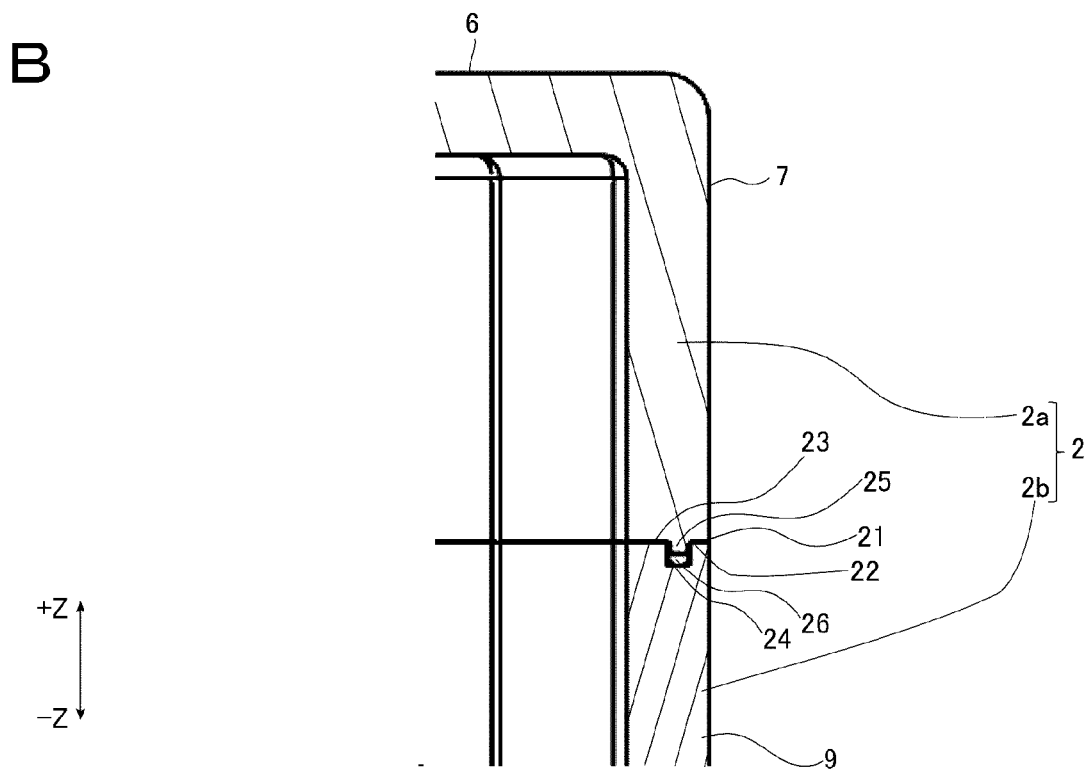

As shown in FIGS. 1, 2B, and 4A, and the other drawings, an insertion hole 10 through which the shoulder screw 14 described later is inserted is formed in the upper case 2a. FIG. 4A is a view of the shoulder screw and a portion around the shoulder screw in a section taken along line IVA-IVA in FIG. 2B. The insertion hole 10 is a through hole. A screw-fastened hole 11 is formed in the lower case 2b. When the upper case 2a and the lower case 2b are fastened as a state where the upper case 2a and the lower case 2b are positioned with each other, the position of the screw-fastened hole 11 is determined such that the screw-fastened hole 11 faces a position of the insertion hole 10. In the example of FIG. 1, the insertion holes 10 and the screw-fastened holes 11 are formed at four corners of the exterior case 2.

The shape and diameter of the insertion hole 10 are not particularly limited, and it is preferable that a step portion 27 corresponding to an outer diameter difference between a head portion 28 (outer diameter R1) and an intermediate portion 29 (outer diameter R2) of the shoulder screw 14 described later is formed on an inner peripheral surface of the insertion hole 10. In this case, a size W of the step portion 27 is preferably equal to or larger than the difference between the outer diameter R1 of the head portion 28 of the shoulder screw 14 and the outer diameter R2 of the intermediate portion 29.

It is preferable that a diameter U2 of a portion of the insertion hole 10 inside the step portion 27 (portion closer to the contact portion 21 side) is less than the diameter R1 of the head portion 28 and is equal to or larger than the diameter R2 of the intermediate portion 29. The closer the diameter U2 is to the same diameter as the diameter R2 of the intermediate portion 29, the easier the insertion hole 10 and the intermediate portion 29 are brought into surface contact with each other, and the waterproofness of the exterior case 2 can be more effectively enhanced.

When the values of W and U2 satisfy the conditions as described above, as shown in FIG. 4A, an upper surface 34 of the step portion 27 serves as a receiving surface of the second elastic member 33. In this case, by sandwiching the upper case 2a between the head portion 28 and the lower case 2b while positioning the head portion 28 and the intermediate portion 29 inside the insertion hole 10, it is easy to prevent the upper case 2a from being easily separated from the lower case 2b.

When the values of W and U2 satisfy the conditions as described above, a diameter U1 of a portion (upper portion) outside the step portion 27 in the insertion hole 10 is equal to or larger than the diameter R1 of the head portion 28.

When the step portion 27 is not formed in the insertion hole 10, the diameter of the insertion hole 10 is determined in the same manner as the diameter U2 described above. In this case, a region of the upper surface portion 6 around an upper end edge of the insertion hole 10 serves as the receiving surface of the second elastic member 33.

The shape and diameter of the screw-fastened hole 11 are not particularly limited as long as a screw portion 30 of the shoulder screw 14 can be screwed into the screw-fastened hole 11.

Figure 5:
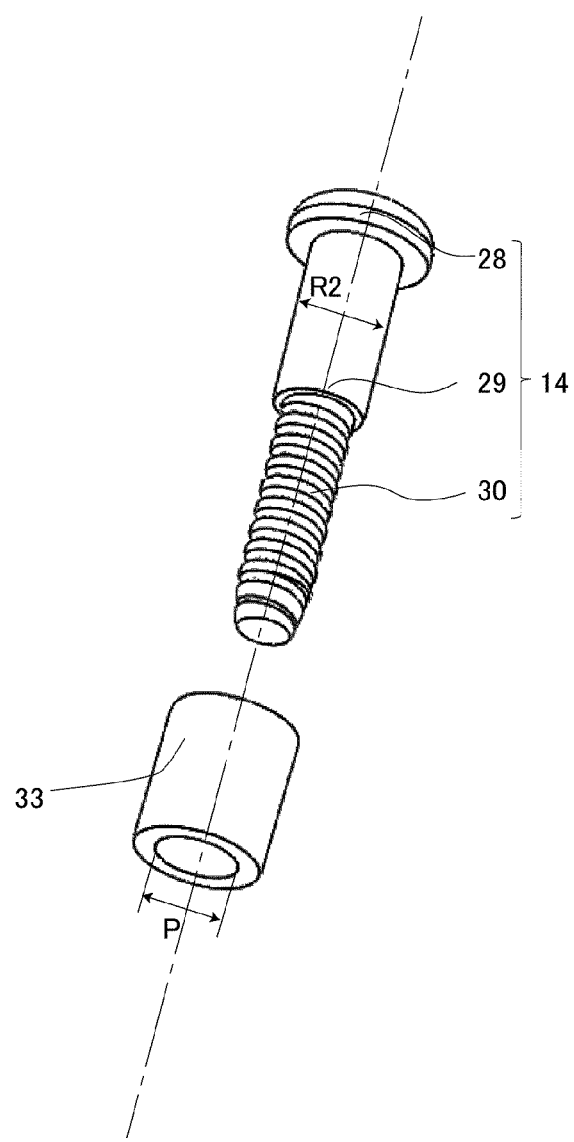
FIG. 5 is an exploded perspective view showing an example of a combination of a shoulder screw and a second elastic member.

As shown in FIG. 4A, the shoulder screw 14 is inserted into the exterior case 2 through the insertion hole 10 to the screw-fastened hole 11. As shown in FIGS. 4A and 5, and the other drawings, the shoulder screw 14 has the head portion 28, the intermediate portion 29, and the screw portion 30. The head portion 28 has a diameter larger than those of the intermediate portion 29 and the screw portion 30. The intermediate portion 29 is formed between the head portion 28 and the screw portion 30, and is larger than the outer diameter of the screw portion 30 and smaller than the outer diameter of the head portion 28. The intermediate portion 29 is a portion formed in a columnar shape and is a non-forming portion of a threaded structure. In the example of FIG. 5, the intermediate portion 29 is formed in a columnar shape. The screw portion 30 is a portion having a threaded structure formed on a peripheral surface.

The outer diameters and lengths (lengths along a screw axial direction) of the head portion 28, the intermediate portion 29, and the screw portion 30 are determined according to the insertion hole 10 and the screw-fastened hole 11.

Figure 6:
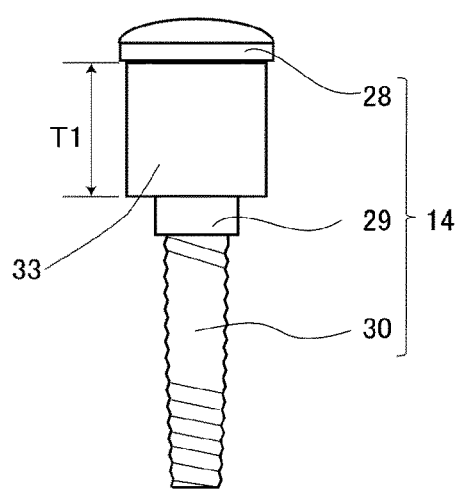
FIG. 6 includes views A to C showing an example of a state in which the shoulder screw and the second elastic member are combined.
Figure 6:
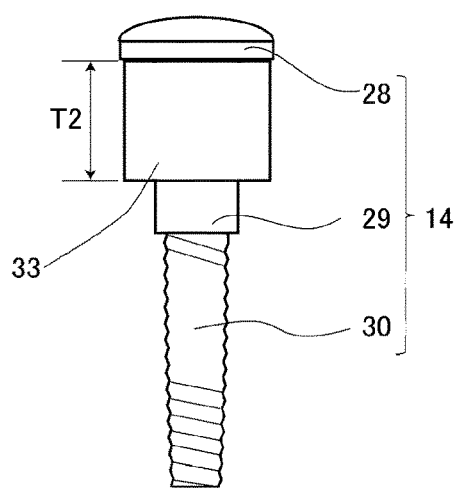
Figure 6:
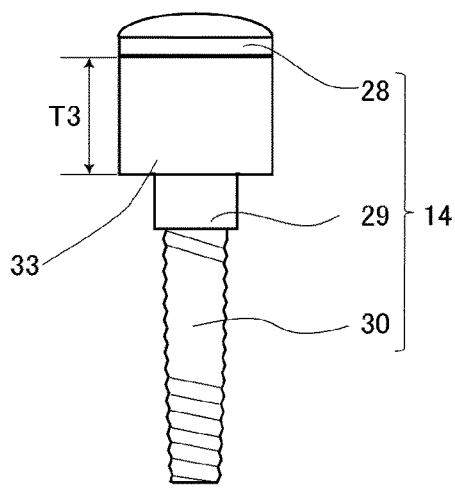

In the battery pack 1, as shown in FIGS. 4A and 6B, the second elastic member 33 is disposed in a compressed state between the head portion 28 of the shoulder screw 14 and the upper case 2a. In FIG. 6, FIGS. 6A, 6B, and 6C are views for explaining a state of the second elastic member. FIG. 6A shows an example of a case where the second elastic member is in an uncompressed state, FIG. 6B shows an example of a state of the second elastic member when the second elastic member is attached to the exterior case together with the shoulder screw, and FIG. 6C shows an example of the state of the second elastic member when pressure in the exterior case increases in the state of FIG. 6B.

In the examples of FIGS. 4A, 5, 6A, 6B, and 6C, a hollow columnar resin elastic body is used as the second elastic member 33. Examples of the hollow columnar resin elastic body include an elastic resin molded body such as an elastomer, a resin closed foam, and rubber. It is more preferable to use rubber from the viewpoint of waterproofness and deterioration over time. Examples of the rubber include silicon rubber, ethylene propylene rubber (EPDM), and fluororubber. In this case, the second elastic member 33 is disposed in the exterior case in a state where the intermediate portion 29 of the shoulder screw 14 is passed through a hollow portion of the resin elastic body.

An inner surface of the second elastic member 33 is preferably in contact with an outer surface of the intermediate portion 29 of the shoulder screw 14. This can be specifically realized, for example, when the second elastic member 33 is formed of a hollow cylindrical elastic resin, by aligning an inner diameter P of the second elastic member 33 with the diameter R2 of the intermediate portion 29 of the shoulder screw 14 (FIGS. 4A, 5, and 6). Since the outer surface of the intermediate portion 29 of the shoulder screw 14 is in contact with the inner surface of the second elastic member 33, when the upper case 2a and the lower case 2b are fastened, a state in which the second elastic member 33 is rigidly snapped onto the intermediate portion 29 of the shoulder screw 14 can be formed, so that wobbling of the second elastic member 33 with respect to the shoulder screw 14 can be suppressed.

As the second elastic member 33, an elastic adhesive may be used. The elastic adhesive may be applied from a lower surface 31 of the head portion 28 of the shoulder screw 14 to a predetermined region of the intermediate portion 29, or may be applied to a predetermined region in the insertion hole 10. Examples of the elastic adhesive include elastic resins such as acrylic-modified silicone-based resins and epoxy-modified silicone-based (two-liquid-mixing curable) resins.

The second elastic member 33 is not limited to a member formed separately from the upper case 2a and the shoulder screw 14 like a hollow cylindrical resin elastic body. The second elastic member 33 may be provided integrally with the upper case 2a, for example. A method of providing the second elastic member 33 integrally with the upper case 2a can be realized by, for example, molding the upper case 2a by a two-color molding method (double molding) using an elastic resin as the second elastic member 33. That is, when the upper case 2a is molded, the method can be realized by performing a two-color molding method using an elastic resin for a portion where the insertion hole 10 is formed and using a resin different from the elastic resin for the other portion of the insertion hole 10.

The upper case 2a and the lower case 2b can be fastened as follows, for example. The first elastic member 26 is disposed in the groove portion 24 formed in the distal end surface 23 of the lower peripheral wall portion 9 in the lower case 2b. The upper case 2a and the lower case 2b are positioned. At this time, the distal end surface 22 of the upper peripheral wall portion 7 and the distal end surface 23 of the lower peripheral wall portion 9 face each other, and the insertion hole 10 of the upper case 2a and the screw-fastened hole 11 of the lower case 2b face each other.

The shoulder screw 14 and the second elastic member 33 are inserted into the insertion hole 10 from the insertion hole 10 side toward the screw-fastened hole 11. The screw portion 30 of the shoulder screw 14 penetrates the insertion hole 10 and reaches the screw-fastened hole 11. At this time, the second elastic member 33 is disposed so as to cover a predetermined region of an outer peripheral surface of the intermediate portion 29 from a position of the lower surface 31 of the head portion 28 of the shoulder screw 14. As shown in FIG. 4A, the second elastic member 33 is disposed from the upper surface 34 of the step portion 27 formed in the upper case 2a to the lower surface 31 of the head portion 28. The screw portion 30 of the shoulder screw 14 is screwed in the screw-fastened hole 11. As the screw portion 30 deeply enters the screw-fastened hole 11, the second elastic member 33 is compressed. The shoulder screw is screwed into the screw-fastened hole 11 until a distal end of the intermediate portion 29 reaches the distal end surface 23 of the lower case 2b. At this time, as shown in FIGS. 6A and 6B, the second elastic member 33 is compressed from a length T1 at the time of non-compression to a length T2 (T2<T1) at the time of attachment to the screw-fastened hole 11. In the example of FIG. 1, with respect to all combinations of the insertion holes 10 and the screw-fastened holes 11 at four corners of the exterior case 2, the screw portion 30 of the shoulder screw 14 is inserted into the screw-fastened hole 11. Thus, the upper case 2a and the lower case 2b are fastened.

As the screw portion 30 of the shoulder screw 14 enters the inside of the screw-fastened hole 11, the protrusion 25 of the upper case 2a enters the inside of the groove portion 24, the first elastic member 26 is compressed, and a hermetically sealed state between the upper case 2a and the lower case 2b is formed as shown in FIGS. 4A and 4B.

As shown in FIG. 2B, the positions of the insertion hole 10 and the screw-fastened hole 11 are formed inside the groove portion 24 in a plan view of the exterior case 2. That is, a fastened position with the shoulder screw 14 is located inside a position where the first elastic member 26 is disposed in a plan view of the exterior case 2. When the resin such as the resin elastic body as described above is used as the second elastic member 33, the fastened position with the shoulder screw 14 may be outside the position where the first elastic member 26 is disposed. The reason why the fastened position with the shoulder screw 14 may be inside or outside the position where the first elastic member 26 is disposed is that when there is a gap between the shoulder screw 14 and the insertion hole 10, the gap can be brought into the hermetically sealed state by the second elastic member 33. Therefore, the positions of the insertion hole 10 and the screw-fastened hole 11 may be outside the groove portion 24 in a plan view of the exterior case 2. The plan view of the exterior case 2 indicates a case where a direction from the upper case 2a toward the lower case 2b along the up-down direction (−Z direction) is the line-of-sight direction.

A crushing load of the second elastic member 33 is preferably twice or more a crushing load of the first elastic member 26. In this case, the hermetically sealed state by the first elastic member 26 can be more efficiently formed by the pressing force applied from the head portion 28 of the shoulder screw 14 to the second elastic member 33. The crushing load indicates a load (N) required to compressively deform the elastic member to be measured by a unit distance.

Figure 7:
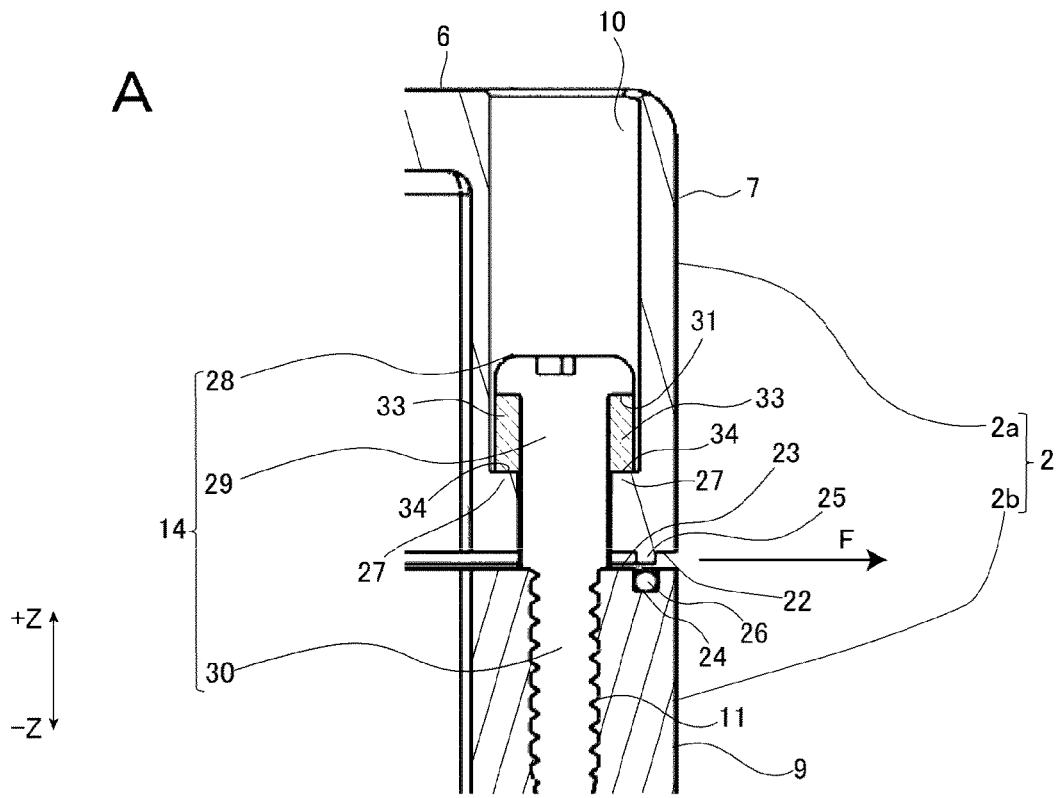
FIG. 7 includes views A and B, where view A is a sectional view showing an example of a state of a mounting position of the shoulder screw when an internal pressure of an exterior case of the battery pack increases, and view B is a sectional view showing an example of a state of other than the mounting position of the shoulder screw when the internal pressure of the exterior case of the battery pack increases.
Figure 7:
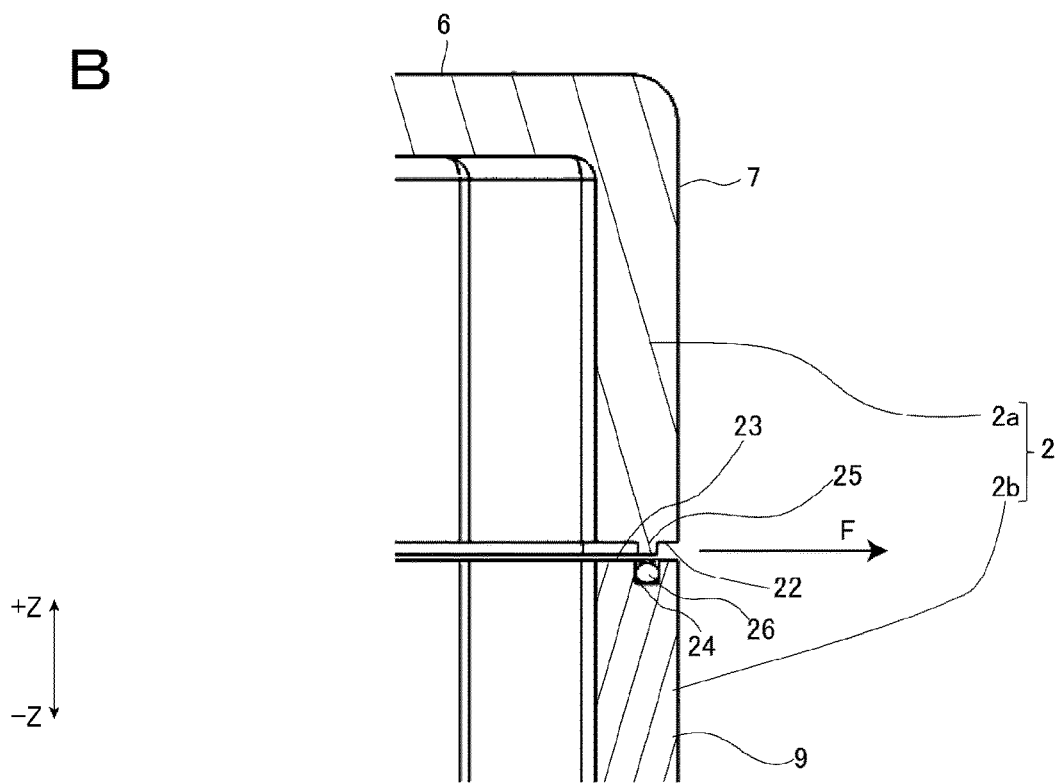

In the battery pack 1, since the second elastic member 33 exists between the head portion 28 of the shoulder screw 14 and the upper case 2a, when the pressure in the exterior case 2 increases in a case where gas is ejected from the battery cell 4 inside the battery pack 1, the second elastic member 33 is further compressed as shown in FIGS. 6B and 6C. The second elastic member 33 is further compressed from the length T2 at the time of attachment to the screw-fastened hole 11 to a length T3 (T3<T2). As the compression of the second elastic member 33 progresses, as shown in FIGS. 7A and 7B, the distal end surface 22 of the upper peripheral wall portion 7 and the distal end surface 23 of the lower peripheral wall portion 9 are separated from each other, a gap is generated between the upper case 2a and the lower case 2b, the compressed state of the first elastic member 26 is loosened, and the hermetically sealed state of the exterior case 2 is released. Then, the gas is quickly released to the outside (in the F direction) from the gap between the upper case 2a and the lower case 2b.

When a gas jet speed from the battery cell 4 is high, the compression of the second elastic member 33 also quickly progresses, so that the gas is quickly released to the outside from the gap between the upper case 2a and the lower case 2b. Therefore, explosion of the battery pack can be prevented when the gas jet speed from the battery cell is high.

When the gas is released and the pressure in the exterior case decreases, the compressed state of the second elastic member 33 is recovered. At this time, the compressed state of the first elastic member 26 is recovered, and the upper case 2a and the lower case 2b come into a close contact state again. When the upper case 2a and the lower case 2b come into the close contact state as described above, a large amount of outside air is restricted from entering the exterior case 2. Therefore, it is possible to suppress burning due to inflow of outside air into the battery pack 1 when the gas is released to the outside.

In the battery pack according to the first embodiment, a resin such as a resin elastic body is used as the second elastic member 33. The second elastic member 33 of the battery pack is not limited thereto, and may be a compression coil spring (second embodiment).

Figure 8:
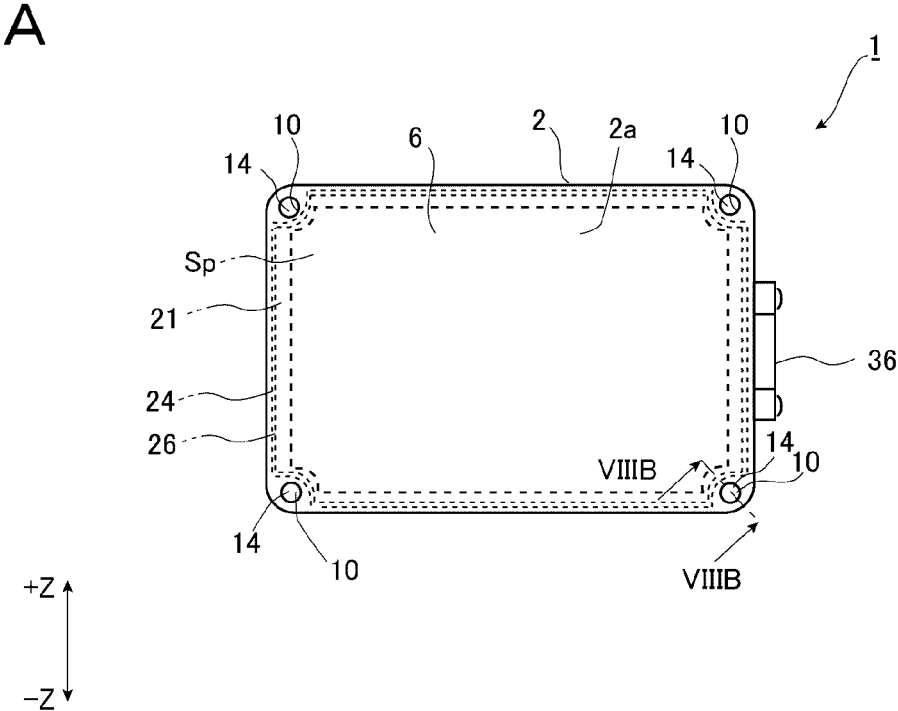
FIG. 8 includes view A and B, where view A is a plan view showing an example of a battery pack according to a second embodiment, and view B is a sectional view for explaining an essential part in a section taken along line IVB-IVB.
Figure 8:
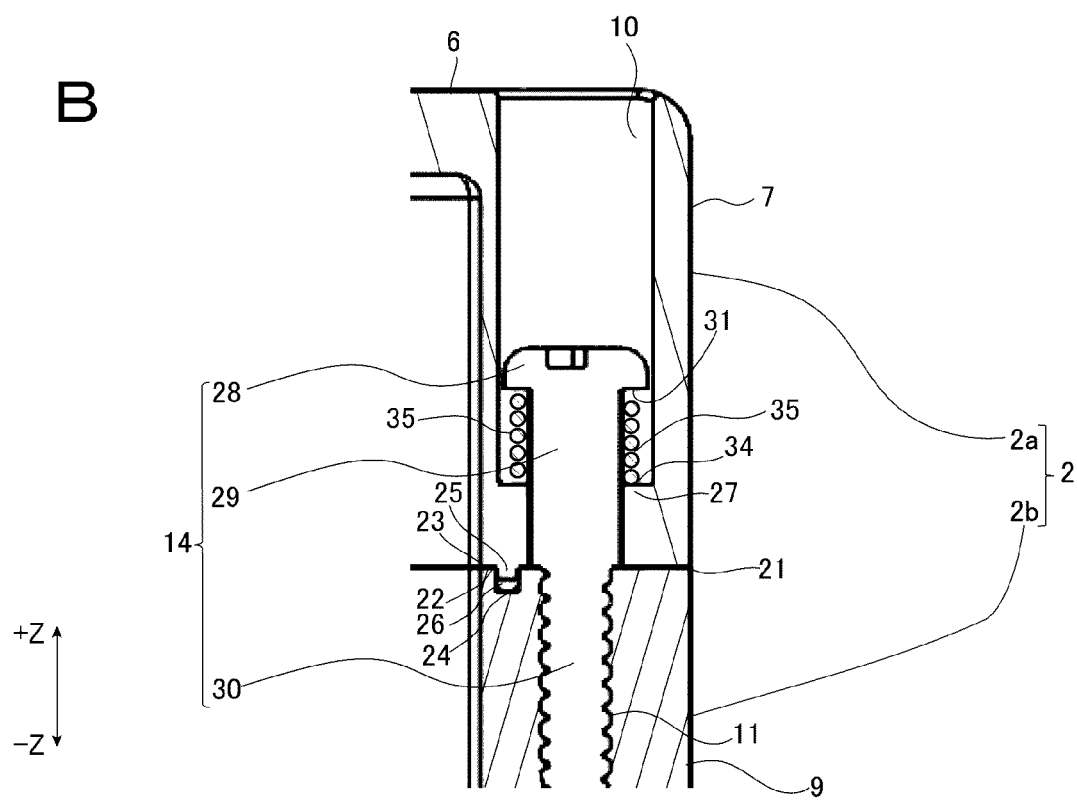

As shown in FIGS. 8A and 8B, the battery pack according to a second embodiment has the same configuration as that of the battery pack according to the first embodiment except that the second elastic member 33 is a compression coil spring 35, and a fastened position with a shoulder screw 14 is outside a position where a first elastic member 26 is disposed in a plan view of an exterior case 2.

The compression coil spring 35 used as the second elastic member 33 is not particularly limited as long as it can sufficiently hermetically seal an internal space of the exterior case 2. As a material of the compression coil spring 35, metal or the like can be exemplified. When the second elastic member 33 is a compression coil spring formed from metal or the like, it is possible to obtain a battery pack that is less likely to cause ultraviolet degradation or the like and is excellent in durability.

In the battery pack 1 according to the second embodiment, the fastened position with the shoulder screw 14 is outside the arrangement position of the first elastic member 26. For example, as shown in FIG. 8A, this can be realized by forming the positions of the insertion hole 10 and the screw-fastened hole 11 described in the battery pack 1 according to the first embodiment outside the groove portion 24. Accordingly, when the outside air and moisture is to enter the inside of the exterior case 2 through a gap between the shoulder screw 14 and the exterior case 2, the first elastic member 26 disposed between the groove portion 24 and a protrusion 25 hermetically seals the internal space of the exterior case 2, so that entry of the outside air and moisture into the exterior case 2 can be restricted.

In the battery pack 1 according to the first embodiment, when the upper case 2a and the lower case 2b are fastened with the plurality of shoulder screws 14, the length of the intermediate portion 29 of at least one of the shoulder screws 14 may be different from the lengths of the intermediate portions 29 of the other shoulder screws 14 (third embodiment).

In a battery pack 1 according to a third embodiment, the length of an intermediate portion 29 of one shoulder screw 14 may be different from the lengths of the intermediate portions 29 of the other shoulder screws 14, the lengths of the intermediate portions 29 of the two or more shoulder screws 14 may be different from the lengths of the intermediate portions 29 of the other shoulder screws 14, or the lengths of the intermediate portions 29 of all the shoulder screws 14 may be different from each other.

Figure 9:
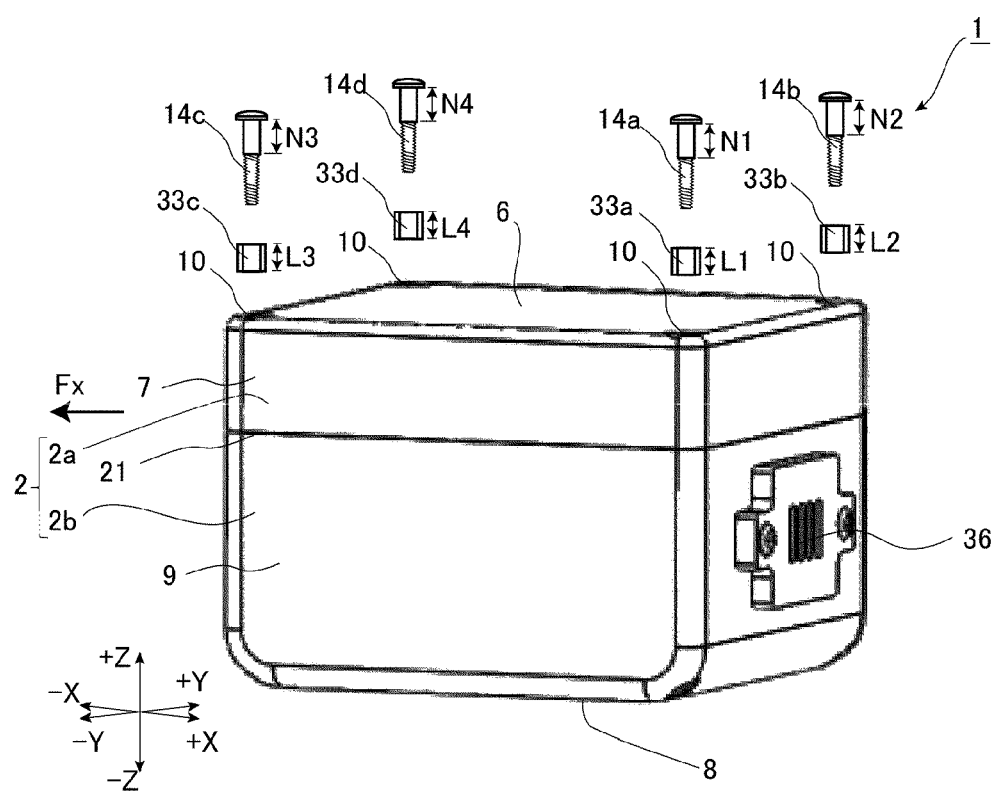
FIG. 9 is a perspective view for describing a third embodiment to a fifth embodiment.

As shown in FIG. 9, when shoulder screws 14a, 14b, 14c, and 14d are provided as the shoulder screws 14 at four corners of an exterior case, from the viewpoint of easily releasing gas in one direction from an exterior case 2 when the gas is jetted from a battery cell 4 inside the battery pack 1, it is preferable that the lengths of the intermediate portions 29 and 29 of the two shoulder screws 14 and 14 adjacent to each other along an outer peripheral edge are different from the lengths of the intermediate portions 29 and 29 of the other shoulder screws 14 and 14. In FIG. 9, second elastic members 33a, 33b, 33c, and 33d are provided as second elastic members 33 corresponding to the shoulder screws 14a, 14b, 14c, and 14d.

For example, as shown in the example of FIG. 9, when the lengths of the intermediate portions 29 of the shoulder screws 14a, 14b, 14c, and 14d are N1, N2, N3, and N4, respectively, in the third embodiment, the lengths of the intermediate portions of the shoulder screws 14c and 14d are longer than the lengths of the intermediate portions of the shoulder screws 14a and 14b, and the values of N3 and N4 are larger than the values of N1 and N2. In this case, in a state where the upper case 2a and the lower case 2b are fastened by the plurality of shoulder screws 14 (normal state), a degree of compression of the two second elastic members 33c and 33d arranged farther from an external connection terminal 36 tends to be smaller than that of the two second elastic members 33a and 33b arranged closer to the external connection terminal 36. That is, the second elastic members 33c and 33d are more likely to be compressed than the second elastic members 33a and 33b. Therefore, a portion to which the shoulder screws 14c and 14d are attached can form a gap between the upper case 2a and the lower case 2b with a smaller force than that in a portion to which the shoulder screws 14a and 14b are attached. Therefore, in this case, when the gas is jetted from the battery cell 4 inside the battery pack 1 and the pressure in the exterior case 2 increases (in an abnormal state), a gap is easily formed between a portion of a lower peripheral wall portion 9 in the lower case 2b opposite to a portion where the external connection terminal 36 is disposed and a portion of an upper peripheral wall portion 7 corresponding to the portion, and the gas is easily released in a direction of arrow Fx. Since the gas is released from the opposite side of the external connection terminal, it is possible to avoid inhibition of the release of the gas by an external device on the external connection terminal side, it is possible to avoid popping out of the battery pack due to the release of the gas, and it is possible to improve safety.

In the battery pack 1 according to the first embodiment, when the upper case 2a and the lower case 2b are fastened with the plurality of shoulder screws 14, and the second elastic member 33 is disposed at each of the shoulder screws 14 (when a plurality of the second elastic members 33 are provided), the length of at least one of the second elastic members 33 at the time of non-compression may be different from the lengths of the other second elastic members 33 at the time of non-compression (fourth embodiment).

In the battery pack 1 according to the fourth embodiment, the length of one second elastic member 33 at the time of non-compression may be different from the lengths of the other second elastic members 33 at the time of non-compression, the lengths of the two or more second elastic members 33 at the time of non-compression may be different from the lengths of the other second elastic members 33 at the time of non-compression, or the lengths of all the second elastic members 33 at the time of non-compression may be different from each other.

As shown in FIG. 9, when shoulder screws 14a, 14b, 14c, and 14d are provided as the shoulder screws 14 at four corners of an exterior case, and second elastic members 33a, 33b, 33c, and 33d are provided as the second elastic members 33 corresponding to the shoulder screws 14a, 14b, 14c, and 14d, it is preferable that the lengths of the two second elastic members 33 adjacent to each other along an outer peripheral edge at the time of non-compression are different from the lengths of the other second elastic members 33 at the time of non-compression.

For example, as shown in the example of FIG. 9, when the lengths (lengths along the up-down direction) of the second elastic members 33a, 33b, 33c, and 33d are L1, L2, L3, and L4, respectively, in the fourth embodiment, the lengths of the second elastic members 33a and 33b are longer than the lengths of the second elastic members 33c and 33d, and the values of L1 and L2 are larger than the values of L3 and L4. In this case, in the normal state where the upper case 2*a* and the lower case 2*b* are fastened by the plurality of shoulder screws 14, the degree of compression of the second elastic members 33*c* and 33*d* tends to be smaller than the degree of compression of the second elastic members 33*a* and 33*b*. That is, the second elastic members 33*c* and 33*d* are more likely to be compressed than the second elastic members 33*a* and 33*b*. Therefore, in this case, as in the third embodiment, when gas is jetted from a battery cell 4 inside the battery pack 1 and the pressure in the exterior case increases, a gap is formed between a portion of a lower peripheral wall portion 9 in the lower case 2*b* opposite to a portion where an external connection terminal 36 is disposed and a portion of an upper peripheral wall portion 7 corresponding to the portion, and the gas is easily released in the direction of arrow Fx.

In the battery pack according to the first embodiment, when the upper case 2*a* and the lower case 2*b* are fastened with the plurality of shoulder screws 14, and the second elastic member 33 is disposed at each of the shoulder screws 14 (when a plurality of the second elastic members 33 are provided), a hardness of at least one of the second elastic members 33 may be different from hardness of the other second elastic members 33 (fifth embodiment). Here, the hardness indicates Shore A hardness.

In a battery pack 1 according to the fifth embodiment, the hardness of one second elastic member 33 may be different from the hardness of the other second elastic members 33, the hardness of the two or more second elastic members 33 may be different from the hardness of the other second elastic members 33, or the hardness of all the second elastic members 33 may be different from each other.

As shown in FIG. 9, when shoulder screws 14*a*, 14*b*, 14*c*, and 14*d* are provided as the shoulder screws 14 at four corners of an exterior case, and second elastic members 33*a*, 33*b*, 33*c*, and 33*d* are provided as the second elastic members 33 corresponding to the shoulder screws 14*a*, 14*b*, 14*c*, and 14*d*, it is preferable that the hardness of the two second elastic members 33 adjacent to each other along an outer peripheral edge are different from the hardness of the other second elastic members 33.

For example, as shown in the example of FIG. 9, when the hardness of the second elastic members 33*a*, 33*b*, 33*c*, and 33*d* are C1, C2, C3, and C4, respectively, in the fifth embodiment, the hardness of the second elastic members 33*a* and 33*b* are larger than the hardness of the second elastic members 33*c* and 33*d*, and the values of C1 and C2 are larger than the values of C3 and C4. In this case, the second elastic members 33*c* and 33*d* are more likely to be compressed than the second elastic members 33*a* and 33*b*. Therefore, in this case, as in the third embodiment, when gas is jetted from a battery cell 4 inside the battery pack 1 and the pressure in the exterior case increases, a gap is formed between a portion of a lower peripheral wall portion 9 in the lower case 2*b* opposite to a portion where an external connection terminal 36 is disposed and a portion of an upper peripheral wall portion 7 corresponding to the portion, and the gas is easily released in the direction of arrow Fx.

Next, as an application example, an electric vehicle including the above-described battery pack will be described. In particular, an electric bicycle will be described below as an example of the electric vehicle.

Figure 10:
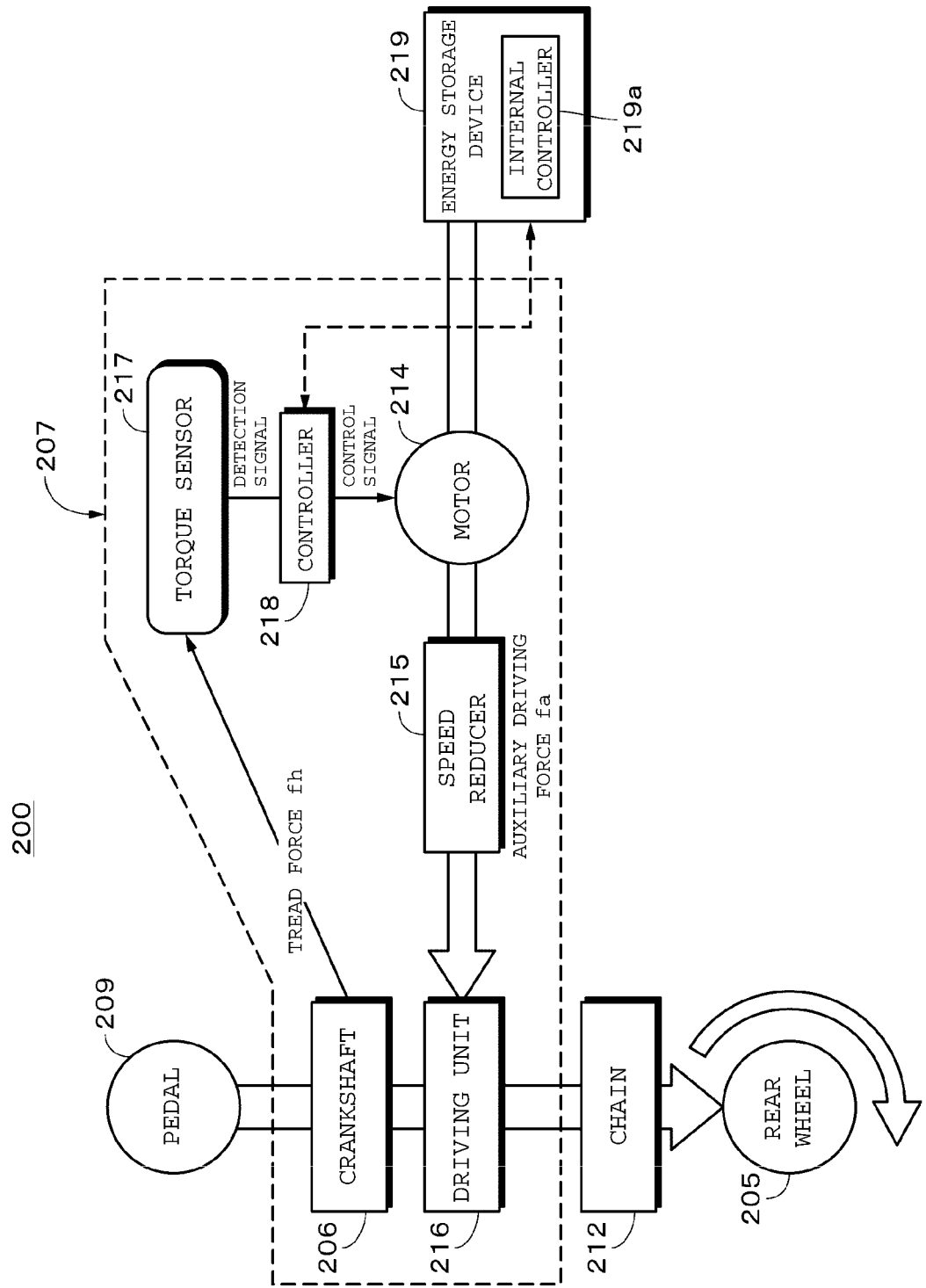
FIG. 10 is a view showing another example of a configuration of an electric bicycle including the battery pack.

FIG. 10 schematically shows an example of a configuration of the electric bicycle when the battery pack is provided in the electric bicycle.

An electric bicycle 200 includes an auxiliary driving device 207 that supplies an auxiliary driving force fa. The auxiliary driving device 207 includes a motor 214 that generates the auxiliary driving force fa, a speed reducer 215, a driving unit 216 that outputs the auxiliary driving force fa to a chain 212, a torque sensor 217 that detects a tread force fh acting on a pedal 209, and a controller 218. The torque sensor 217 detects the tread force fh from a torque applied to a crankshaft 206, and for example, a magnetostrictive sensor or the like is used.

The left and right pedals 209 to which the tread force fh is applied are attached to both ends of the crankshaft 206. A rear wheel 205 is interlockingly connected to the crankshaft 206 via the chain 212, and the tread force fh and the auxiliary driving force fa are transmitted to the rear wheel 205 via the chain 212.

The controller 218 is constituted of an electric circuit and the like including a microcomputer and includes a storage unit and the like including a nonvolatile memory. The controller 218 controls the motor 214 based on a detection signal input from the torque sensor 217 as needed. The controller 218 corresponds to an external controller.

An energy storage device 219 is detachably provided on a vehicle body of the electric bicycle 200. The energy storage device 219 supplies power to the auxiliary driving device 207 in a state of being attached to the electric bicycle 200. As the energy storage device 219, the battery pack described in the first to fifth embodiments is applied.

The energy storage device 219 supplies a first electric power to the motor 214. Furthermore, the energy storage device 219 supplies a second electric power to the controller 218. The controller 218 of the auxiliary driving device 207 and a controller (internal controller) 219*a* of the energy storage device 219 communicate with each other.

Since the energy storage device 219 is the battery pack described in the first to fifth embodiments, when an abnormality occurs in the battery cell housed in the battery pack constituting the energy storage device and gas is jetted from the battery cell to the internal space of the exterior case, the gas can be quickly discharged from the battery pack, and an accident of the electric bicycle due to rupture of the battery pack (rupture of the energy storage device) can be suppressed.

One or more embodiments (e.g., first to fifth embodiments) including examples of the present application have been described herein; however, the present is not limited thereto, and various modifications can be made.

For example, the configurations, the methods, the processes, the shapes, the materials, the numerical values, and the like mentioned in the above-described embodiments and application examples are merely examples. Different configurations, methods, processes, shapes, materials, numerical values, and the like may be used as necessary. The configuration, the methods, the processes, the shapes, the materials, the numerical values and the like in the above-described embodiments and application examples may be combined insofar as they are not departing from the spirit of the present invention.

A description of certain reference symbols is provided below and as previously provided according to an embodiment of the present application:

1: Battery pack
2: Exterior case
2*a*: Upper case
2*b*: Lower case
4: Battery cell
14: Shoulder screw 26: First elastic member
27: Step portion
28: Head portion
29: Intermediate portion
30: Screw portion
33: Second elastic member
35: Compression coil spring It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
a battery cell;
one or more shoulder screws having a head portion, a screw portion, and an intermediate portion between the head portion and the screw portion, the intermediate portion being larger than an outer diameter of the screw portion and smaller than an outer diameter of the head portion; and
an exterior case including an upper case and a lower case fastened to each other with the one or more shoulder screws,
wherein a first elastic member is disposed in a compressed state at a contact portion between the upper case and the lower case, and a second elastic member is disposed in a compressed state between the head portion and the upper case, and
wherein the second elastic member is a hollow columnar elastic resin.

2. The battery pack according to claim 1, wherein the first elastic member is an O-ring.

3. The battery pack according to claim 1, wherein an inner surface of the second elastic member is in contact with an outer surface of the intermediate portion of the shoulder screw.

4. The battery pack according to claim 1, wherein the second elastic member is a compression coil spring, and
a fastened position with the shoulder screw is outside a position where the first elastic member is disposed in a plan view of the exterior case.

5. An electric vehicle comprising the battery pack according to claim 1.

6. A battery pack comprising:
a battery cell;
one or more shoulder screws having a head portion, a screw portion, and an intermediate portion between the head portion and the screw portion, the intermediate portion being larger than an outer diameter of the screw portion and smaller than an outer diameter of the head portion; and
an exterior case including an upper case and a lower case fastened to each other with the one or more shoulder screws,
wherein a first elastic member is disposed in a compressed state at a contact portion between the upper case and the lower case, and a second elastic member is disposed in a compressed state between the head portion and the upper case, and wherein the second elastic member is an elastic resin and is provided integrally with the upper case.

7. An electric vehicle comprising the battery pack according to claim 6.

8. A battery pack comprising:
a battery cell;
one or more shoulder screws having a head portion, a screw portion, and an intermediate portion between the head portion and the screw portion, the intermediate portion being larger than an outer diameter of the screw portion and smaller than an outer diameter of the head portion; and
an exterior case including an upper case and a lower case fastened to each other with the one or more shoulder screws,
wherein a first elastic member is disposed in a compressed state at a contact portion between the upper case and the lower case, and a second elastic member is disposed in a compressed state between the head portion and the upper case, and wherein the upper case is provided with an insertion hole of the one or more shoulder screws,
a step portion corresponding to an outer diameter difference between the head portion and the intermediate portion of the one or more shoulder screws is formed in the insertion hole, and
an upper surface of the step portion is a receiving surface of the second elastic member.

9. An electric vehicle comprising the battery pack according to claim 8.

10. A battery pack comprising:
a battery cell;
one or more shoulder screws having a head portion, a screw portion, and an intermediate portion between the head portion and the screw portion, the intermediate portion being larger than an outer diameter of the screw portion and smaller than an outer diameter of the head portion; and
an exterior case including an upper case and a lower case fastened to each other with the one or more shoulder screws,
wherein a first elastic member is disposed in a compressed state at a contact portion between the upper case and the lower case, and a second elastic member is disposed in a compressed state between the head portion and the upper case, and wherein the plurality of shoulder screws are provided, and
a length of the intermediate portion of at least one of the shoulder screws is different from lengths of the intermediate portions of the other shoulder screws.

11. An electric vehicle comprising the battery pack according to claim 10.

12. A battery pack comprising:
a battery cell;
one or more shoulder screws having a head portion, a screw portion, and an intermediate portion between the head portion and the screw portion, the intermediate portion being larger than an outer diameter of the screw portion and smaller than an outer diameter of the head portion; and
an exterior case including an upper case and a lower case fastened to each other with the one or more shoulder screws,
wherein a first elastic member is disposed in a compressed state at a contact portion between the upper case and the lower case, and a second elastic member is disposed in a compressed state between the head portion and the upper case, and wherein the second elastic member includes a plurality of the second elastic members, and a length of at least one of the second elastic members at a time of non-compression is different from lengths of the other second elastic members at the time of non-compression.

13. An electric vehicle comprising the battery pack according to claim 12.

14. A battery pack comprising:

a battery cell;

one or more shoulder screws having a head portion, a screw portion, and an intermediate portion between the head portion and the screw portion, the intermediate portion being larger than an outer diameter of the screw portion and smaller than an outer diameter of the head portion; and an exterior case including an upper case and a lower case fastened to each other with the one or more shoulder screws, wherein a first elastic member is disposed in a compressed state at a contact portion between the upper case and the lower case, and a second elastic member is disposed in a compressed state between the head portion and the upper case, and wherein the second elastic member includes a plurality of second elastic members, and a hardness of at least one of the second elastic members is different from hardnesses of the other second elastic members.

15. An electric vehicle comprising the battery pack according to claim 14.

\* \* \* \* \*